United States Patent [19]

Redmond et al.

[11] Patent Number: 4,703,371
[45] Date of Patent: Oct. 27, 1987

[54] DISK DRIVE FORMATTING

[75] Inventors: Donald R. Redmond, San Jose; John H. Dieckman, Sunnyvale, both of Calif.

[73] Assignee: Xebec, Carson City, Nev.

[21] Appl. No.: 707,756

[22] Filed: Mar. 4, 1985

[51] Int. Cl.⁴ .............................................. G11B 5/54
[52] U.S. Cl. ........................................ 360/75; 360/78
[58] Field of Search .................................... 360/75, 78

[56] References Cited

U.S. PATENT DOCUMENTS

| | | | |
|---|---|---|---|
| 4,086,636 | 4/1978 | Cizmic et al. | 360/75 |
| 4,200,894 | 4/1980 | Kaseda et al. | 360/106 |
| 4,371,902 | 2/1983 | Baxter et al. | 360/75 |
| 4,390,912 | 6/1983 | Hertrich et al. | 360/78 |
| 4,395,742 | 7/1983 | Ostroff | 360/78 |
| 4,471,396 | 9/1984 | Iftikar et al. | 360/106 |
| 4,495,533 | 1/1985 | Chambers | 360/75 |
| 4,511,938 | 4/1985 | Betts | 360/77 |
| 4,524,398 | 6/1985 | Fujiki | 360/78 |
| 4,531,167 | 7/1985 | Berger | 360/71 |
| 4,539,607 | 9/1985 | Fujiki | 360/78 |

Primary Examiner—George G. Stellar
Attorney, Agent, or Firm—Thomas E. Schatzel

[57] ABSTRACT

A method of formatting a drive system for a magnetic data storage disk which eliminates the need for track-zero sensors. According to the method, formatting is begun at a first crash stop and proceeds across the disk to the opposite crash stop, in incremental steps from track to track.

8 Claims, 1 Drawing Figure

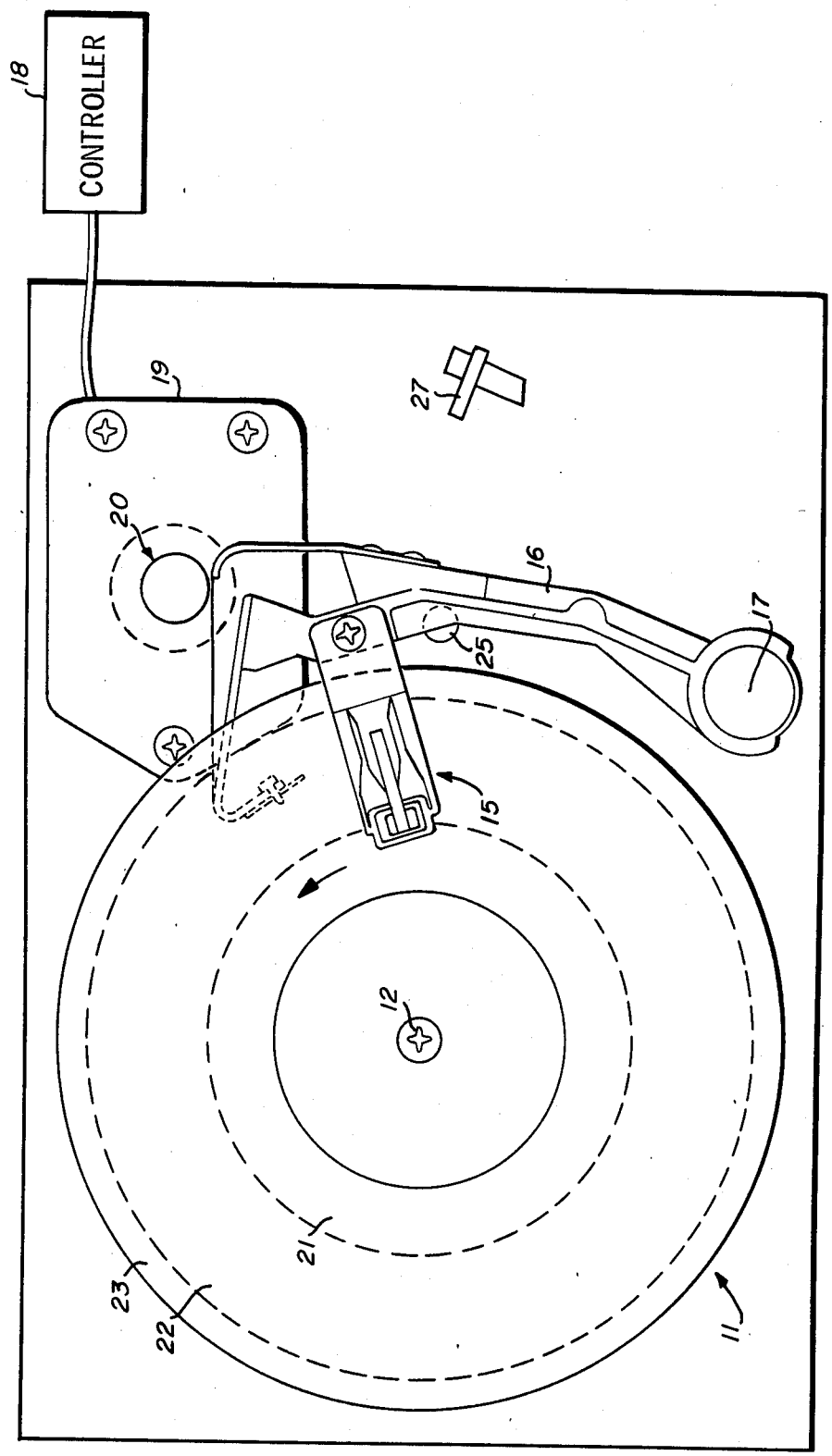

DISK DRIVE FORMATTING

BACKGROUND OF THE INVENTION

1. Field of the Invention

The present invention relates to improved ways and means to format the drive for a magnetic recording disk and, more particularly, to such ways and means which operate without sensors for sensing the location of the read/write transducer utilised in conjunction with the disk.

2. Description of the Prior Art

In the field of electronic computer technology, it is typical to store data in binary form on the face of a rotatable disk, which face is coated with a magnetizable substance such as iron oxide. In operation, such disks are rotated somewhat like phonograph records and the binary data is encoded upon, or retrieved from, the face of the disk by a movable magnetic transducer device called a read/write head. More particularly, the binary information is magnetically encoded on the face of the disk in concentric rings, called tracks, and the read/write transducer is selectively positioned in a direction radial of the disk to select a particular track at which information is to be recorded or retrieved.

On such magnetic recording disks, it is known to have track densities of about one thousand tracks per inch of the radius of the disk. Accordingly, precise positioning of a read/write head is necessary so that the head can accurately gain access to a particular desired track on the surface of the disk.

In conventional magnetic recording disk systems, a read/write transducer is driven to seek a desired track on the disk by means of a motor called a stepping motor coupled to a capstan mechanism. Such motors and capstan mechanisms translate electrical commands from a controller for the disk drive system to linear movement of the read/write transducer radially across the face of the magnetic recording disk. To accurately locate the read/write transducer on a desired track on a magnetic disk, it is necessary that the controller have precise information as to the location of the read/write head relative to the disk. To have such information, it is conventional for the controller to keep an account of the movements (i.e., radial steps) of the read/write head from some initial location, either at the inner or outer periphery of the disk. Thus, for example, if the read/write transducer were initially at the inner periphery of the disk (typically called the inner guard band) and moved thirty tracks radially outward of the disk, the controller would store such positioning information and, if it were necessary to subsequently move the read/write head a number of tracks radially inward of the disk, the controller would compute the radial steps required to reach new position based upon the information previously stored in the controller relating to prior movements of the read/write head. Accordingly, in conventional controller systems for read/write heads, it is necessary for the controller to precisely monitor and record each movement of the read/write head, so as to be aware of the location of the read/write head at any instant. Obviously, in such systems, it is critical to have exact information as to the starting point of the movement of the read/write head; in typical disk drive systems, the starting point of movement of the read/write head is known as "track-zero".

In prior art controller systems for disk drives utilizing an "open-loop" mode of operating control, it is conventional to provide a sensor device for sensing the track-zero location of the read/write head. Such a sensor device physically senses any contact with the read/write transducer or its positioning mechanism and transmits information relating to such contact to the disk drive controller. In practice, the track-zero sensor is carefully and precisely located during fabrication of the disk drive so that the read/write head can be exactly placed at the starting place of the data field on a magnetic recording disk. Precise location of the track-zero sensor in such prior art systems has been understood to be critical to reliability of the read/write function, not only insofar as locating the beginning of the data area on a magnetic recording disk but also for accurately locating any defect locations on the disk.

To format disk drive systems incorporating track-zero sensors, the read/write transducer is radially moved across the face of a magnetic recording disk until the track-zero sensing line is found. Then, after this information is transmitted to the controller unit by the track-zero sensor device, the controller unit operates the positioning mechanism for the read/write transducer such that the transducer incrementally steps from track-to-track across the disk to a desired location in the data area for the entry or reading of particular data.

It may be appreciated that a track-zero sensor is a critical and costly element in such prior art systems. Not only is there an initial cost to providing a track-zero sensor and its associated drivers and receivers to transmit information from the sensor to the controller, but there is a need for precise adjustment of the position of the track-zero sensor during the manufacturing of the disk drive assembly. As might be expected, there are also frequent needs to provide adjustment or maintenance of the track-zero sensors after the disk drive assemblies have been placed in actual usage.

SUMMARY OF THE INVENTION

It is an object of the present invention to provide a method formatting a drive system associated with a magnetic recording disk which eliminates the need for track-zero sensors.

An associated object of the present invention is to provide a method of operating a drive system for a magnetic recording disk which functions satisfactorily without track zero sensor.

In accordance with the preceding object, the present invention provides a method of formatting a drive system for a magnetic data storage disk comprising the steps of: (a) providing a first stationary stop member to prevent movement of a read/write transducer beyond a first point relative to the disk; (b) beginning at a location adjacent the first stop member, controlling the read/write transducer to move a first number of incremental steps radially outward across the disk and, at each incremental step, magnetically encoding information on the face of the disk to identify separate tracks defining an inner guard band; (c) controlling the read/write transducer to move a second number of steps across the face of the disk and, at each step, magnetically encoding information of the disk to identify separate track defining a band of concentric data storage tracks; and (d) move a third number of incremental steps radially outward across the face of the magnetic storage disk and, at each incremental step, magnetically encoding information on the face of the disk to identify an outer guard band.

In accordance with the preceding summary, an advantage of the present invention is the provision of a method of formatting a drive system for a magnetic data storage disk, which formatting can be accomplished without track-zero sensors as heretofore utilized.

Another advantage of the present invention is the provision of a method of operating a drive system for a magnetic recording disk which functions satisfactorily without track zero sensors.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a pictorial diagram, not drawn to scale, of a read/write transducer positioned on a magnetic data storage disk.

DETAILED DESCRIPTION OF THE PREFERRED EMBODIMENT

FIG. 1 shows a magnetic data recording disk 11 mounted for rotation about its central axis 12, a read/write head or transducer 15 mounted to an arm 16 for pivotal movement about pivot axis 17 in a generally radial direction relative to the face of the disk 11, and a controller 18 (schematically illustrated) which controls the movement of the arm 16, via a conventional stepping motor 19 and capstan mechanism 20, to selectively position the read/write transducer 15 at a particular radial location relative to the rotating disk 11.

The face of disk 11 should be understood to include a plurality of magnetically-defined concentric tracks each spaced from the other by a predetermined radial distance. On a typical magnetic recording disk having a 5¼ inch diameter, for example, it is typical to provide four to six hundred such concentric tracks and thirty-two angular sectors. It should also be understood that the tracks and sectors are defined only by magnetic codings upon the face of the disk.

In practice, the face of the recording disk 11 may be understood to be further divided into three concentric bands 21, 22 and 23 of tracks. The first band 21, nearest the center of the disk is normally called the inner guard band. Typically it comprises about thirty to fifty tracks. Outside the inner guard band is a relatively wide band 22 of tracks upon which data is stored during normal usage of the disk; this may be called the data storage band and typically comprises about 300 to 600 tracks. The third band 23 extends beyond the data storage band to near the peripheral edge of the disk. This band is normally called the outer guard band and may comprise about eight to sixteen tracks.

In accordance with the present invention, there are provided first and second mechanical stop members 25 and 27 which mechanically interact with the arm 16 which operates the read/write transducer 15 to define, respectively, the limits of the radially inward and radially outward travel of the read/write transducer. As such, the stop members may be called "crash stops" because physical abutment or other mechanical interaction involving the stops prevents travel of the arm beyond a particular point. Preferably, the positions of the stop members 25 and 27 are mechanically adjustable.

To operate the system of FIG. 1 in a meaningful manner, the controller 18 must have information as to the position of the read/write transducer 15 relative to the disk 11 at any given time. Conventionally, such information is imparted to the controller 18 via track-zero sensors which, in essence, provide electrical signals to signify to the controller 18 that the arm 16 has reached a known position relative to track-zero, the initial track of the data storage band 21. (Typically, track zero would be the boundary between the inner guard band 21 and the data band 22.) By way of contrast, the system of FIG. 1 formats the controller 18 without the usage of such sensors and, thereafter, operates without reliance upon a track-zero sensor.

In accordance with the method of the present invention, the controller 18 is oriented by first placing the arm 16 at the stopping point defined by the first mechanical stop member 25, which abutts the arm. From that point, the arm 16 is controlled to move the read/write transducer 15 in incremental steps radially outward across the face of the magnetic storage disk 11. Then, immediately after a radial step is taken by the arm 16, the read/write transducer 15 is controlled to read track identifying information, if any, from the track upon which it is located. (During initial formatting, there normally would not be track-identifying information on the face of the disk 11). If the read/write transducer 15 does not read any track-identifying information from the face of the disk 11, the read/write transducer is controlled to magnetically encode information upon the track to identify the radial position of the track relative to the face of the disk. At the same time, such information is stored in the memory of the controller 18. Preferably, the track-identifying information comprises a unique magnetic code, or byte, which signifies that the track lies within the inner guard band 21. Subsequently, the controller 18 will cause the read/write transducer 15 to move radially outward across the face of the disk 11 in incremental steps, similarly marking each track in the inner guard band 21.

Preferably, prior to moving from one track to another, the read/write transducer 15 is controlled to read the information from the track on which it has just written the track-identifying information to verify that the information so read is the same as the information previously written. One benefit of this verification procedure is to prevent the system from attempting to perform the formatting function where the storage disk media 11 is defective. Another benefit of the verification procedure will become clear in conjunction with the discussion hereafter of the outer guard band 23.

In practice, each track is divided into a predetermined number of angular sectors (usually thirty-two), and the track-identifying information is stored at each sector along a track. So, in a typical case, track-identifying information would be stored at thirty-two separate locations, each in a different sector, along a track. The field of data in a sector containing location-identifying information is typically referred to as an ID (identifier) field. Thus, in accordance with the present invention, information which identifies a track as lying within the inner guard band 21, the outer guard band 23, or the data band 22 is stored in the ID field for each non-defective sector on a disk 11.

After a predetermined number of steps corresponding to the desired number of tracks within the inner guard band 21, the magnetic code which is written upon a track is changed to a second code which designates that the track lies within the data storage band 22. Subsequently and in manner similar, to operation within the inner guard band 21, the controller 18 will cause the read/write transducer 15 to move radially across the face of the disk 11 in incremental steps marking each sector in each track until a predetermined number of tracks in the data storage band 22 have been so designated. At that point, the magnetic code which is written upon a track is changed to a third code which designates that subsequent tracks in a direction radially outward of the disk 11 lie in the outer guard band 23.

To format the disk drive in the outer guard band 23, the controller 18 again directs the read/write transducer 15 to travel across the face of the disk in incremental steps. Again, prior to each step, the read/write transducer 15 is controlled to verify that the information read from the track is the same information as previously written. Then, following such verification, the controller 18 causes the read/write transducer 15 to move another track radially outwardly on the face of the disk 11. After incremental step to the next track, the controller, 18 again operates the read/write transducer 15 to read information, if any, stored at the track. In the event that the information read from the track is the same as the information written by the read/write transducer 15 prior the step, the controller 18 will determine that the read/write transducer 15 has not moved radially and, instead, has reached the limit of travel defined by the stop member 27 and, therefore, is at the periphery of the outer guard band 23.

Upon reaching the radially outward boundary of the outer guard band 23 as defined by the stop member 27, the formatting of the disk drive controller 18 is essentially complete, and the system can be utilized to accurately store or retrieve data from the magnetic storage disk 11 or other such formatted disks without the use of track-zero sensors. In such operation, wherever the read/write transducer 15 initially lands upon the disk 11, the ID information on a sector can be read and, hence, the location of the read/write head 15 determined. For example, if the read/write head 15 initially lands on the inner guard band 21, the ID information stored on that band and adjacent bands is sufficient to inform the controller 18 that the read/write transducer 15 must be stepped radially outwardly to reach track-zero in the band of data storage tracks. Likewise, if the read/write head 15 initially lands on the outer guard band 23, the ID information stored on that band informs the controller 18 that the read/write head 15 must travel from track-to-track radially inward to reach track-zero of the data storage tracks.

Although the present invention has been described in terms of the presently preferred embodiments, it is to be understood that such disclosure is not to be interpreted as limiting. Various alterations and modifications will no doubt become apparent to those skilled in the art after having read the above disclosure. For example, the formatting function could be initiated at the periphery of the outer guard band 23 as defined by the stop member 27 and then proceed across the disk 11 to the stop member at the inner periphery of the inner guard band 21. Accordingly, it is intended that the appended claims be interpreted as covering all alterations and modifications as fall within the true spirit and scope of the invention.

We claim:

1. A method of formatting the drive for a magnetic data storage disk utilized in combination with a controllably movable read/write transducer comprising the steps of:

a. providing a first stationary mechanical stop member to prevent the read/write transducer from moving radially inward beyond a first point relative to the surface of the disk;

b. positioning the read/write transducer against the first stationary mechanical stop member;

c. controlling the read/write transducer to move a first number of incremental steps radially outward across the face of the magnetic data storage disk and, at each incremental step, magnetically encoding information on the face of the disk to identify separate tracks as being members of a first guard band of concentric tracks;

d. controlling the read/write transducer to move a second number of incremental steps radially outward across the face of the disk and, at each step, magnetically encoding information on the disk to identify separate tracks as being members of a band of concentric data storage tracks;

e. controlling the read/write transducer to move a third number of incremental steps radially outward across the magnetic storage disk and, at each incremental step, magnetically encoding information on the disk to identify separate tracks as being members of a second guard band of concentric tracks;

f. immediately after a step is taken to a radially outward track, the read/write transducer is controlled to read track identifying information, if any, from the track upon which it is located and, if no track identifying information is available on the track for reading, proceeding to control the read/write transducer to magnetically encode information upon the track to identify its radial position relative to the face of the disk; and g. prior to the read/write transducer stepping from one track to another, the read/write transducer is controlled to read the track identifying information from the track on which it has just written information to verify that the information so read is the same as the information previously written, such that defection sections of the disk are identified; and, upon said verification, controlling the movement of the read/write transducer to incrementally step to a radially adjacent track.

2. A method of formatting a magnetic data storage disk according to claim 1 wherein each track on the face of the disk is divided into a given number of sectors and, near the beginning of each sector, information is magnetically encoded upon the face of the disk which identifies the sector as lying within said first guard band, or said band of data storage tracks, or said second guard band.

3. A method of formatting a magnetic data storage disk according to claim 1 further including the step of providing a second stationary mechanical stop member to prevent the read/write transducer from moving radially outward beyond the outer periphery of said second guard band.

4. A method of formatting a magnetic data storage disk according to claim 1 wherein, if the information read from a track after an incremental step has been taken, is the same as the information written by the read/write transducer prior to the step, then ceasing the formatting operation and signifying the arm carrying the read/write transducer has reached a second stationary stop member associated with the opposite periphery of the disk.

5. A method of formatting the drive for a magnetic data storage disk utilized in combination with a controllably movable read/write transducer comprising the steps of:

a. providing a first stationary mechanical stop member to prevent the read/write transducer from moving radially outward beyond a first point relative to the surface of the disk;

b. positioning the read/write transducer against the first stationary stop member;

c. controlling the read/write transducer to move a first number of incremental steps radially inward across the face of the magnetic data storage disk and, at each incremental step, magnetically encoding information on the face of the disk to identify separate tracks as being members of a first guard band of concentric tracks;

d. controlling the read/write transducer to move a second number of incremental steps radially inward across the face of the disk and, at each step, magnetically encoding information on the disk to identify separate tracks as being members of a band of concentric data storage tracks;

e. controlling the read/write transducer to move a third number of incremental steps radially inward across the magnetic storage disk and, at each incremental step, magnetically encoding information on the disk to identify separate tracks as being members of a second guard band of concentric tracks;

f. immediately after a step is taken to a radially inward track, the read/write transducer is controlled to read track identifying information, if any, from the track upon which it is located and, only if no track identifying information is available on the track for reading, proceeding to control the read/write transducer to magnetically encode information upon the track to identify its radial position relative to the face of the disk; and g. prior to the read/write transducer stepping from one track to another, the read/write transducer is controlled to read the track identifying information from the track upon which it has just written information to verify that the information so read is the same as the information previously written, such that defective sections of the disk are identified; and, upon said verification, controlling the movement of the read/write head to incrementally step to a radially adjacent track.

6. A method of formatting a magnetic data storage disk according to claim 5 wherein each track on the face of the disk is divided into a given number of sectors and, near the beginning of each sector, information is magnetically encoded upon the face of the disk which identifies the sector as lying within said first guard band, or said band of data storage tracks, or said second guard band.

7. A method of formatting a magnetic data storage disk according to claim 5 further including the step of providing a second stationary mechanical stop member to prevent movement of the read/write transducer beyond the inner periphery of said second guard band.

8. A method of formatting a magnetic data storage disk according to claim 5 wherein, if the information read from a track after an incremental step has been taken, is the same as the information written by the read/write transducer prior to the step, then ceasing the formatting operation and signifying that the arm carrying the read/write transducer has reached a second stationary mechanical stop member associated with the opposite periphery of the disk.

* * * * *